United States Patent
Suh et al.

(10) Patent No.: US 6,947,112 B2
(45) Date of Patent: Sep. 20, 2005

(54) LIQUID CRYSTAL DISPLAY

(75) Inventors: Dong Hae Suh, Daegu (KR); Young Il Park, Seoul (KR); Hee Cheol Kim, Seoul (KR); Hwan Su Shim, Kyoungki-do (KR); Won Geon Lee, Seoul (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/630,038

(22) Filed: Jul. 30, 2003

(65) Prior Publication Data

US 2004/0021817 A1 Feb. 5, 2004

(30) Foreign Application Priority Data

Aug. 1, 2002 (KR) .................. 10-2003-0045641
Apr. 8, 2003 (KR) .................. 10-2003-0021853

(51) Int. Cl.[7] ................. G02F 1/1335; G02F 1/337
(52) U.S. Cl. ................. 349/117; 349/96; 349/113; 349/123; 349/128
(58) Field of Search ................. 349/96, 99, 113, 349/117, 121, 23, 128

(56) References Cited

U.S. PATENT DOCUMENTS

| | | | | |
|---|---|---|---|---|
| 5,142,393 A | * | 8/1992 | Okumura et al. | 349/121 |
| 5,361,151 A | * | 11/1994 | Sonehara et al. | 349/98 |
| 5,490,003 A | * | 2/1996 | Van Sprang | 349/96 |
| 5,619,356 A | * | 4/1997 | Kozo et al. | 349/99 |
| 6,295,113 B1 | * | 9/2001 | Yang | 349/179 |
| 2002/0093620 A1 | * | 7/2002 | Itou et al. | 349/179 |

* cited by examiner

Primary Examiner—Tarifur R. Chowdhury
(74) Attorney, Agent, or Firm—Ladas & Parry LLP

(57) ABSTRACT

The present invention relates to a liquid crystal display, comprising a lower alignment film formed on a lower substrate; an upper alignment film formed on an upper substrates; a liquid crystal layer sandwiched between the lower and upper substrates; a phase compensation film adhered on the outer surface of the upper substrate and a polarizer adhered on the phase compensation film wherein the lower alignment film has an alignment angle of 10–20° with respect to a horizontal line, the upper alignment film has an alignment angle of 40 to 55° with respect to a horizontal line, the liquid crystal layer has a phase delay value ($d\Delta n$) of 0.24–0.27 $\mu$m, the phase compensation film has a phase compensation function of $\lambda/4$ and also has an optical axis making 140–146° with a horizontal line and the polarizer has an absorption axis making 120 to 122.5° with a horizontal line.

2 Claims, 7 Drawing Sheets

LIQUID CRYSTAL DISPLAY

BACKGROUND OF THE INVENTION

1. Field of the Invention

The present invention relates to a liquid crystal display, and more particularly, to a liquid crystal display device having optimized characteristic parameters, and thus having improved display characteristics and increased cell gap margin.

2. Description of the Prior Art

Generally, liquid crystal displays are divided into a transmissive liquid crystal display using backlight as a light source, a reflective liquid crystal display using natural light without backlight, and a transflective liquid crystal display, which selectively uses backlight or natural light according to circumstance.

Among such display devices, the reflective liquid crystal display requiring no backlight is useful for portable display systems, since it can have low consumption power, thin thickness and lightweight. As the market of mobile phones and portable devices is extended, a demand for the reflective liquid crystal display is gradually increased.

This reflective liquid crystal display comprises a lower substrate, a reflective electrode, a lower alignment film, a liquid crystal layer, an upper alignment film, a transparent electrode, a color filter, an upper substrate, a phase compensation film, and a polarizer, which are successively stacked on top of each other.

Moreover, the liquid crystal displays can be divided into TN (Twisted nematic) mode, GH (Guest Host) mode, ECB (Electrically Controlled Birefringence) mode, and OCB (Optically Compensated Birefringence) mode, according to their operation mode.

The TN liquid crystal display is currently widely used in computers and measurement devices, but has the problem of slow response speed. The ECB liquid crystal display is a mode of inducing a change in light transmittance by a change in birefringence of liquid crystal cells, and its typical example includes a HAN (Hybrid-Aligned Nematic) mode. The HAN mode liquid crystal display is actively studied since it has advantages in that it is operated at relatively low electric power and has fast operation speed.

Hereinafter, the structure and display characteristics of the reflective liquid crystal display will be briefly described.

FIG. 1 is a cross-sectional view, which schematically shows a reflective liquid crystal display according to the prior art. As shown in FIG. 1, the reflective liquid crystal display according to the prior art comprises a lower substrate 1 comprising a reflective electrode 2 and a lower alignment film 3, and an upper substrate 4 comprising a color substrate 2 and a upper alignment film 6 and disposed opposite to the lower substrate 1 while sandwiching a liquid crystal layer 10 therebetween. And on the outer surface of the upper substrate 4, a phase compensation film 7, such as a $\lambda/4$ film, and a polarizer 8, are successively adhered. The reflective electrode 2 has a rugged portion on its surface, which is formed by a lithography or holography process.

In this reflective liquid crystal display, upon no voltage application, light which was linearly polarized by passage through the polarizer is converted into circularly polarized light, such as left-circularly-polarized light, by passage through the phase compensation film. The circularly polarized light is converted into linearly polarized light by passage through the liquid crystal layer and reflected in the reflective electrode. Then, the linearly polarized light reflected in the reflective electrode is converted into left-circularly-polarized light by passage through the liquid crystal layer, after which it is passed through the phase compensation film and thus converted into linearly polarized light whose polarizing direction is parallel to the polarizing axis of the polarizer. Then, the linearly polarized light is passed through the polarizer to achieve a white state.

Moreover, in the reflective liquid crystal display, upon voltage application, light which was converted into left-circularly-polarized light by passage through the phase compensation film is passed through the liquid crystal layer intact and reflected in the reflective electrode to convert it into right-circularly-polarized light. This right-circularly-polarized light is passed through the liquid crystal layer and the phase compensation film to convert it into linearly polarized light whose polarizing direction is perpendicular to the polarization axis of the polarizer. Thus, the linearly polarized light cannot be passed through the polarizer so that a dark state is achieved.

In the reflective liquid crystal display, good display characteristics vary on how to optimize a characteristic value of the respective elements as described above. In other words, for an efficient increase in reflectance in the reflective liquid crystal display, the angle of the absorption axis or transmission axis of the polarizer, the optical characteristics of the phase compensation film, the thickness (d) of the liquid crystal layer, the phase delay value ($d\Delta n$) of the liquid crystal layer, the twist angle of liquid crystal molecules, the alignment angle of the alignment film, and the characteristics of the reflective film, etc., must be optimized.

For example, in the prior reflective liquid crystal display, good display characteristics can be obtained when one or two $\lambda/4$ films 7 are used, the alignment angle of the upper alignment film 6 is perpendicular to that of the lower alignment film, and the transmission axis of the polarizer 8 makes a 20° degree with the alignment angle of the upper alignment film 6 while making a 45° angle with the optical axis angle of the $\lambda/4$ film 7. In this case, the twist angle of liquid crystals and the phase delay value of the liquid crystal layer are controlled to about 63 to 80°, and 0.20 to 0.27 $\mu$m, respectively.

However, in the prior reflective liquid crystal display, if two $\lambda/4$ films are used for the optimization of a cell design, a reduction in reflectivity will be caused, whereas if one $\lambda/4$ film is used, a function of providing a phase difference of $\lambda/4$ over a wide range of visible light wavelengths will not sufficiently performed so that bad display characteristics will be caused.

In addition, in the prior reflective liquid crystal display, cell gap provided for obtaining good display characteristics is extremely small, and thus, yield in an actual process for the production of the prior reflective crystal display is disadvantageously reduced.

SUMMARY OF THE INVENTION

Accordingly, the present invention has been made to solve the above-mentioned problems occurring in the prior art, and an object of the present invention is to provide a liquid crystal display having improved display characteristics.

Another object of the present invention is to provide a liquid crystal display having ensured sufficient cell gap and thus improved process margin.

To achieve the above objects, in one embodiment, the present invention provides a liquid crystal display, which comprises: a lower substrate having a reflective electrode; a lower alignment film formed on the lower substrate; an upper substrate having a color filter and disposed opposite to the lower substrate; an upper alignment film formed on the upper substrate; a liquid crystal layer sandwiched between the lower and upper substrates; a phase compensation film adhered on the outer surface of the upper substrate and serving to convert linearly polarized light into circularly polarized light; and a polarizer adhered on the phase compensation film and serving to convert natural light from the external into linearly polarized light, wherein the lower alignment film has an alignment angle of −10 to 20° with respect to a horizontal line; the upper alignment film has an alignment angle of 40 to 55° with respect to a horizontal line; the liquid crystal layer has a phase delay value (dΔn) of 0.24–0.27 μm; the phase compensation film has a phase compensation function of λ/4 and also has an optical axis making an angle of 140 to 146° with a horizontal line; and the polarizer has a absorption axis making an angle of 120 to 122.5° with a horizontal line.

In the liquid crystal display according to this embodiment, the liquid crystal layer is preferably made of twisted nematic liquid crystals having a twist angle of 60°.

In another embodiment, the present invention provides a liquid crystal display, which comprises: a lower substrate having a reflective electrode; a lower alignment film formed on the lower substrate; an upper substrate having a color filter and disposed opposite to the lower substrate; an upper alignment film formed on the upper substrate; a liquid crystal layer sandwiched between the lower and upper substrates; a phase compensation film adhered on the outer surface of the upper substrate and serving to convert linearly polarized light into circularly polarized light; and a polarizer adhered on the phase compensation film and serving to convert natural light from the external into linearly polarized light; wherein the lower alignment film has an alignment angle of 0 to 10° with respect to a horizontal line; the upper alignment film has an alignment angle of 55 to 65° with respect to a horizontal line; the liquid crystal layer has a phase delay value (dΔn) of 0.23–0.27 μm; the phase compensation film has a phase compensation function of λ/4 and also has an optical axis making an angle of 160 to 168° with a horizontal line; and the polarizer has a absorption axis making an angle of 117.5 to 127.5° with a horizontal line.

In the liquid crystal display according to this embodiment, the liquid crystal layer is preferably made of twisted nematic liquid crystals having a twist angle of 76°.

In still another embodiment, the present invention provides a liquid crystal display which comprises: a lower substrate having a reflective electrode; a lower alignment film formed on the lower substrate; an upper substrate having a color filter and disposed opposite to the lower substrate; an upper alignment film formed on the upper substrate; a liquid crystal layer sandwiched between the lower and upper substrates; a phase compensation film adhered on the outer surface of the upper substrate and serving to convert linearly polarized light into circularly polarized light; and a polarizer adhered on the phase compensation film and serving to convert natural light from the external into linearly polarized light; wherein the lower alignment film has an alignment angle of 0 to 10° with respect to a horizontal line; the upper alignment film has an alignment angle of 50 to 56° with respect to a horizontal line; the liquid crystal layer has a phase delay value (dΔn) of 0.17–0.21 μm; the phase compensation film has a phase compensation function of λ/4 and also has an optical axis making an angle of 135 to 145° with a horizontal line; and the polarizer has a absorption axis making an angle of 62–66° with a horizontal line.

In the liquid crystal display according to this embodiment, the liquid crystal layer is made of twisted nematic liquid crystals having a twist angle of 53°.

In yet another embodiment, the present invention provides a liquid crystal display, which comprises: a lower substrate having a reflective electrode; a lower alignment film formed on the lower substrate; an upper substrate having a color filter and disposed opposite to the lower substrate; an upper alignment film formed on the upper substrate; a liquid crystal layer sandwiched between the lower and upper substrates; a phase compensation film adhered on the outer surface of the upper substrate and serving to convert linearly polarized light into circularly polarized light; and a polarizer adhered on the phase compensation film and serving to convert natural light from the external into linearly polarized light; wherein the lower alignment film has a pre-tilt angle selected from 80 to 90° and less than 2°, and an alignment angle of −40 to −50° with respect to a horizontal line; the upper alignment film has a pre-tilt angle selected from 2° or less and 80 to 90° in the opposite manner to the lower alignment film, and an alignment angle of 40 to 50° with respect to a horizontal line; the liquid crystal layer is a HAN-mode liquid crystal layer serving to convert the phase of transmitted light depending on electric field application or no electric field application and has a phase delay value (dΔn) of 0.36–0.40 μm; the phase compensation film has a phase compensation function of λ/4 and also has an optical axis making an angle of 167 to 173° or 7 to 13° with a horizontal line; and the polarizer has a transmission axis making an angle of 42 to 48° with a horizontal line.

In the liquid crystal display according to this embodiment, the liquid crystal layer is preferably made of twisted nematic liquid crystals having a twist angle of 90°. The phase compensation film preferably has a phase compensation delay value of 0.14–0.15 μm.

In still another embodiment, the present invention provides a liquid crystal display which comprises: a lower substrate having a reflective electrode; a lower alignment film formed on the lower substrate; an upper substrate having a color filter and disposed opposite to the lower substrate; an upper alignment film formed on the upper substrate; a liquid crystal layer sandwiched between the lower and upper substrates; a phase compensation film adhered on the outer surface of the upper substrate and serving to convert linearly polarized light into circularly polarized light; and a polarizer adhered on the phase compensation film and serving to convert natural light from the external into linearly polarized light; wherein a unit pixel of the liquid crystal display is divided into first and second regions; a portion of the lower alignment film corresponding to the first region is treated such that it vertically or horizontally aligns liquid crystal molecules in the first region, and a portion of the lower alignment region corresponding to the second region is treated such that it horizontally or vertically aligns liquid crystal molecules in the second region in the opposite manner to the first region, the lower alignment film having an alignment angle of −40 to −50° with respect to a horizontal line; a portion of the upper alignment film corresponding to the first region is treated such that it vertically or horizontally aligns liquid crystal molecules in the first region in the opposite manner to the portion of the lower alignment film corresponding to the first region, and a portion of the upper alignment region corresponding to the second region is treated such that it horizontally or vertically aligns liquid crystal molecules in the second region in the opposite manner to the first region, the upper alignment film having an alignment angle of 40 to 50° with respect to a horizontal line; the liquid crystal layer is a HAN-mode liquid crystal layer serving to convert the phase of transmitted light depending on electric field application or no electric field application and has a phase delay value (dΔn) of 0.36–0.40 μm; the phase compensation film has a phase compensation function of λ/4 and also has an optical axis making an angle of 167 to 173° with a horizontal line; and the polarizer has a transmission axis making an angle of 42 to 48° with a horizontal line.

In the liquid crystal display according to this embodiment, the lower alignment film and the upper alignment film preferably have different pre-tilt angles of 2° or less and 80 to 90°. The liquid crystal layer is preferably made of twisted nematic liquid crystals having a twist angle of 90°. The phase compensation film preferably has a phase compensation delay value of 0.14–0.15 μm.

In yet another embodiment, the present invention provides a liquid crystal display which comprises: a lower substrate having a reflective electrode; a lower alignment film formed on the lower substrate; an upper substrate having a color filter and disposed opposite to the lower substrate; an upper alignment film formed on the upper substrate; a liquid crystal layer sandwiched between the lower and upper substrates; a phase compensation film adhered on the outer surface of the upper substrate and serving to convert linearly polarized light into circularly polarized light; and a polarizer adhered on the phase compensation film and serving to convert incident light into linearly polarized light; wherein a unit pixel of the liquid crystal display is divided into a transmission region and a reflection region having the reflective electrode; a portion of the lower alignment film corresponding to the reflection region is treated such that it vertically or horizontally aligns liquid crystal molecules in the reflection region, and a portion of the lower alignment region corresponding to the transmission region is treated such that it horizontally or vertically aligns liquid crystal molecules in the transmission region in the opposite manner to the reflection region, the lower alignment film having an alignment angle of −40 to −50° with respect to a horizontal line; a portion of the upper alignment film corresponding to the reflection region is treated such that it vertically or horizontally aligns liquid crystal molecules in the reflection region in the opposite manner to the portion of the lower alignment film corresponding to the reflection region, and a portion of the upper alignment region corresponding to the transmission region is treated such that it horizontally or vertically aligns liquid crystal molecules in the transmission region in the opposite manner to the reflection region, the upper alignment film having an alignment angle of 40 to 50° with respect to a horizontal line; a portion of the liquid crystal layer corresponding to the reflection region is made of a HAN-mode liquid crystal layer, and a portion of the liquid crystal region corresponding to the transmission region is made of a TN mode liquid crystal layer; the phase compensation film has a phase compensation function of λ/4 and also has an optical axis making an angle of 167 to 173° with a horizontal line; and the polarizer has a transmission axis making an angle of 42 to 48° with a horizontal line.

In the liquid crystal display according to this embodiment, the lower alignment film and the upper alignment film preferably have different pre-tilt angles of 2° or less and 80 to 90°. The HAN mode liquid crystal layer and the TN mode liquid crystal layer are preferably made of twisted nematic liquid crystals having a twist angle of 90°. The HAN mode and TN mode liquid crystal layers preferably have a phase delay value (dΔn) of 0.36–0.40 μm. The phase compensation film preferably has a phase compensation delay value of 0.14–0.15 μm.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
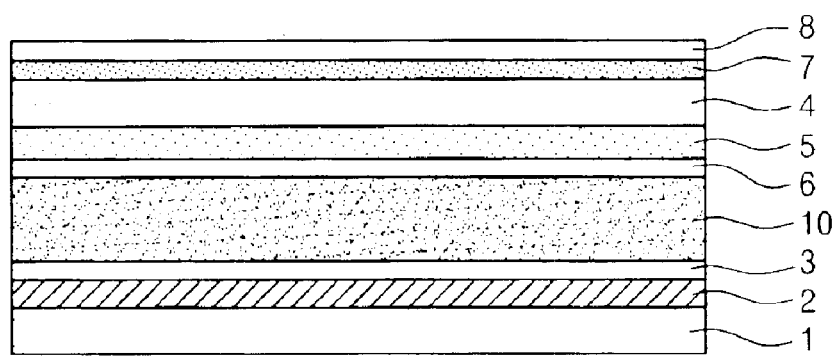
FIG. 1 is a cross-sectional view showing a reflective liquid crystal display according to the prior art.

A liquid crystal display of the present invention comprises a lower substrate including a lower alignment film and a reflective electrode having a rugged portion on its surface; an upper substrate including a color filter and an upper alignment film; a liquid crystal layer sandwiched between the upper and lower substrates; a phase compensation film adhered on the outer surface of the upper substrate and serving to convert linearly polarized light into circularly polarized light; and a polarizer adhered on the phase compensation film and serving to convert natural light from the external into linearly polarized light.

In the liquid crystal display of the present invention, the lower and upper substrates have the same thickness and refractive index of about 0.4–0.7t and 1.5, respectively. Also, the thickness and refractive index of a counter electrode in the upper substrate are about 1,500 Å and 1.6, respectively, and the thickness and refractive index of the upper alignment film are about 750 Å and 1.6. Moreover, the reflective electrode made of AlNd has a thickness of about 1,500 Å.

In order to more effectively align liquid crystal molecules, the upper and lower alignment films are made of polyamic acid-based materials in view of hydropilicity with the liquid crystal molecules and adhesion to the substrates.

The phase compensation film is formed of one λ/4 film. The λ/4 film is produced by uniaxial orientation of a polymer film, such as polycarbonate, polyvinyl alcohol, or polystyrene film, such that it has a certain phase difference.

Furthermore, the liquid crystal display of the present invention has the cell structure optimized by the control of characteristic values of its elements, and thus, shows good display with high contrast ratio, good color characteristics and high reflectance, and also has increased cell gap margin.

Parameters to be considered in making the cell structure optimal include the angle of the absorption axis or transmission axis of the polarizer, the angle of the optical axis of two birefringent films forming the λ/4 film, the phase delay value of the liquid crystal layer, and the alignment angle of the alignment film, etc.

Embodiment 1

The characteristic values of elements according to a first embodiment of the present invention, which can make the cell structure optimal, are as follows.

Embodiment 1-1

A liquid crystal layer in a liquid crystal display according to this embodiment is made of TN liquid crystals having a twist angle of 60°. If the liquid crystal layer has a phase delay value of 0.24–0.27 μm, a liquid crystal display having increased cell gap margin, high contrast ratio and excellent color characteristics will be obtained.

In this case, the alignment angle of the lower alignment film which can make a cell structure optimal is −10 to −20° with respect to a horizontal line, the alignment angle of the upper alignment film is 40 to 55° with respect to a horizontal line, the optical axis of the λ/4 film makes an angle of 140 to 146° with a horizontal line, and the absorption axis of the polarizer makes an angle of 102 to 122.5° with a horizontal line.

Figure 2:
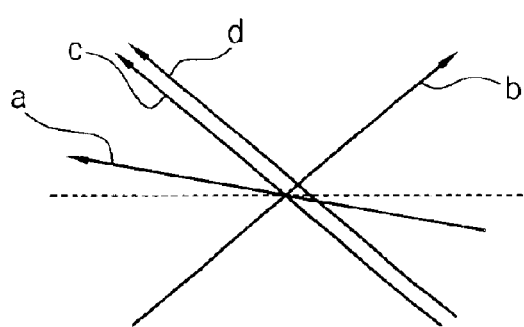
FIGS. 2 to 4 show the axial arrangement of elements of liquid crystal displays according to an embodiment of the present invention.

FIG. 2 shows the axial arrangement of elements of the liquid crystal display according to this embodiment. In FIG. 2, the reference numeral a designates the rubbing axis of the lower substrate, i.e., the alignment angle of the lower alignment film, b the rubbing axis of the upper substrate, i.e., the alignment angle of the upper alignment film, c the optical axis of the λ/4 film, and d the absorption axis of the polarizer.

Embodiment 1-2

A liquid crystal layer in a liquid crystal display according to this embodiment is made of TN liquid crystals having a twist angle of 76°. If the liquid crystal layer has a phase delay value of 0.23–0.27 μm, a liquid crystal display having increased cell gap margin, high contrast ratio and excellent color characteristics will be obtained.

In this case, the alignment angle of the lower alignment film which can make a cell structure optimal is 0 to 10° with respect to a horizontal line, the alignment angle of the upper alignment film is 55 to 65° with respect to a horizontal line, the optical axis of the λ/4 film makes an angle of 160 to 168° with a horizontal line, and the absorption axis of the polarizer makes an angle of 117 to 127.5° with a horizontal line.

Figure 3:
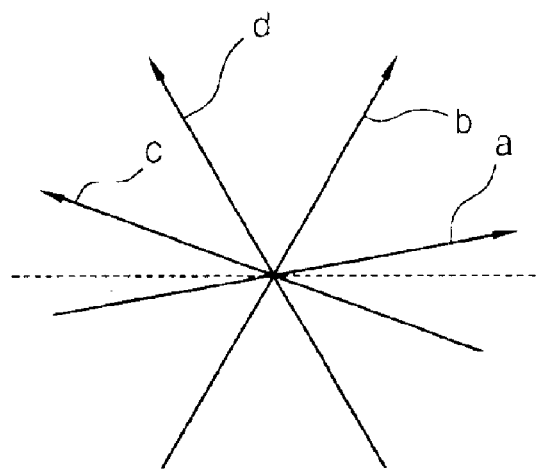

FIG. 3 shows the axial arrangement of elements of the liquid crystal display according to this embodiment. In FIG. 3, the reference numeral a designates the rubbing axis of the lower substrate, i.e., the alignment angle of the lower alignment film, b the rubbing axis of the upper substrate, i.e., the alignment angle of the upper alignment film, c the optical axis of the λ/4 film, and d the absorption axis of the polarizer.

Embodiment 1-3

A liquid crystal layer in a liquid crystal display according to this embodiment is made of TN liquid crystals having a twist angle of 53°. If the liquid crystal display has a phase delay value of 0.17–0.21 μm, a liquid crystal display having increased cell gap margin, high contrast ratio and excellent color characteristics will be obtained.

In this case, the alignment angle of the lower alignment film which can make a cell structure optimal is 0 to 10° with respect to a horizontal line, the alignment angle of the upper alignment film is 50 to 56° with respect to a horizontal line, the optical axis of the λ/4 film makes an angle of 135 to 145° with a horizontal line, and the absorption axis of the polarizer makes an angle of 62 to 66° with a horizontal line.

Figure 4:
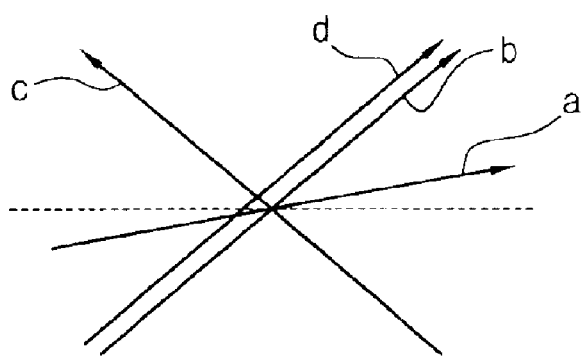

FIG. 4 shows the axial arrangement of elements of the liquid crystal display according to this embodiment. In FIG. 4, the reference numeral a designates the rubbing axis of the lower substrate, i.e., the alignment angle of the lower alignment film, b the rubbing axis of the upper substrate, i.e., the alignment angle of the upper alignment film, c the optical axis of the λ/4 film, and d the absorption axis of the polarizer.

In the embodiments as described above, when the twist angle of liquid crystals is 60°, the angle between the alignment angle of the upper alignment film and the transmission angle of the polarizer is designed as 28 to 32°, and when the twist angle of the liquid crystals is 76°, the angle between the alignment angle of the upper alignment film and the transmission angle of the polarizer is designed as 31.5 to 37.5°.

As described above, according to the present invention, the twist angle of liquid crystals is designed as 50°, 63° and 76° while the phase delay value of the liquid crystal layer is designed as 0.24–0.27 μm, 0.23–0.27 μm and 0.17–0.21 μm, respectively. In addition, the alignment angle of the alignment films, the optical axis angle of the λ/4 film, and the absorption or transmission axis angle of the polarizer, are suitably controlled. For this reason, the present invention allows the production of a liquid crystal display having good display characteristics. Furthermore, the liquid crystal display of the present invention will have a cell gap of about 3.6–4.0 μm, and thus, increased cell gap margin as compared to that of the prior liquid crystal display having a cell gap of about 2.9–3.5 μm.

Figure 5:
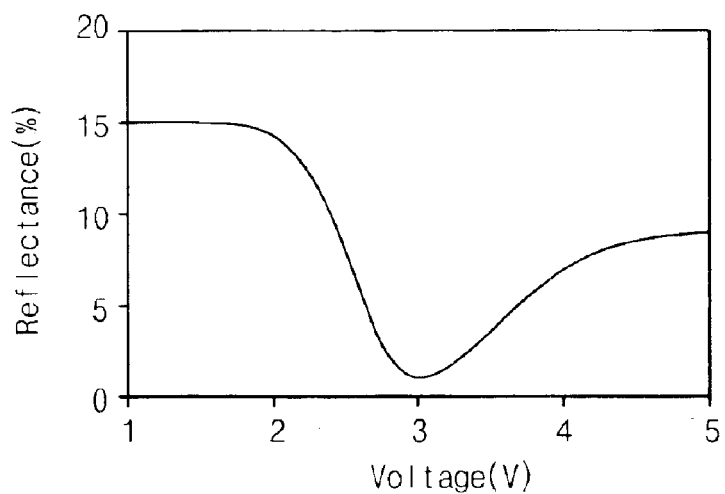
FIGS. 5 to 7 are graphs showing a change in reflectance according to voltage of liquid crystal displays according to an embodiment of the present invention.
Figure 6:
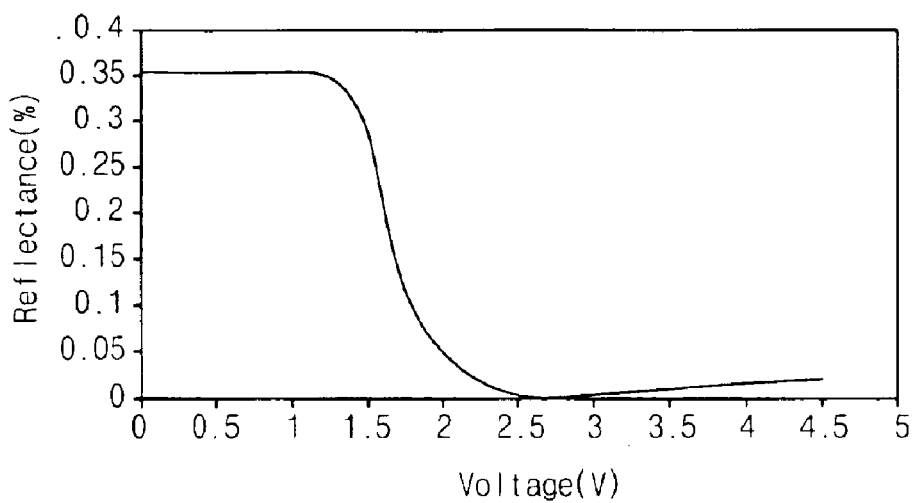
Figure 7:
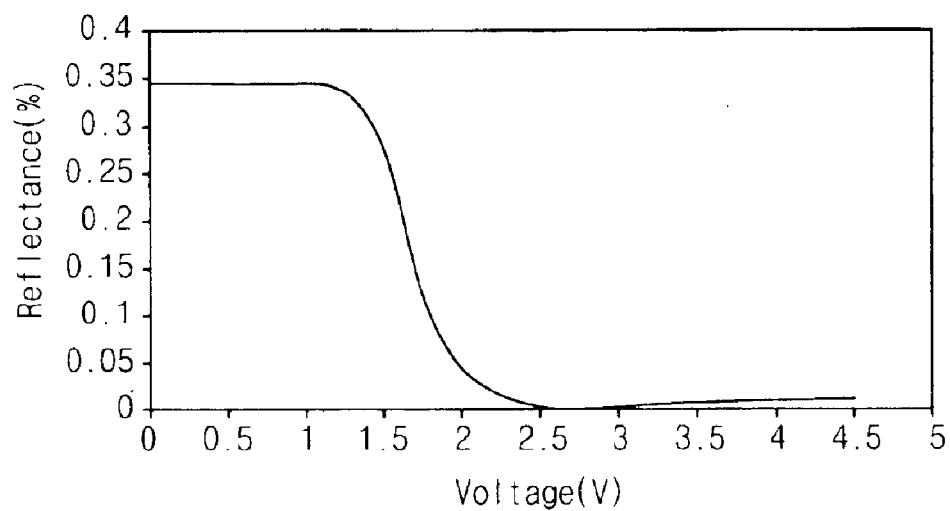

FIGS. 5 to 7 are graphs showing a change in reflectance according to voltage in liquid crystal displays. FIG. 5 is a graph showing a change in reflectance according to voltage in a reflective liquid crystal display manufactured by Matsushita Co., Ltd., Japan. FIGS. 6 and 7 are graphs showing a change in reflectance according to voltage in inventive reflective liquid crystal displays having twist angles of liquid crystal molecules of 60° and 70°, respectively.

As shown in FIG. 5, the Matsushita's reflective liquid crystal display cannot achieve a complete dark state upon voltage application. On the other hand, as shown in FIGS. 6 and 7, the reflective liquid crystal displays according to the present invention achieve a dark state upon voltage application. Thus, it can be found that the liquid crystal displays of the present invention have a superior reflectance characteristic according to voltage than that of the Matsushita's reflective liquid crystal display.

Furthermore, in the liquid crystal display according to the present invention, drive voltage can be reduced while maintaining contrast ratio at the same level.

As a result, the liquid crystal display according to the first embodiment of the present invention is designed to have the twist angle of liquid crystal molecules of 76°, the phase delay value of the liquid crystal layer of 0.25 μm, and the cell gap of the liquid crystal layer of 3.6 μm, so that it can have good display characteristics and can be easily applied in an actual process due to an increase in cell gap.

Embodiment 2

The characteristic values of elements according to a second embodiment of the present invention, which can make the cell structure optimal, are as follows.

A liquid crystal layer in a liquid crystal display according to this embodiment is made of an HAN mode liquid crystal layer, which converts the phase of transmitted light depending on whether electric field is applied or not. This HAN mode liquid crystal layer is made of twisted nematic liquid crystal molecules having a twist angle of 90°. The HAN mode liquid crystal layer has a phase delay value (dΔn) of 0.36–0.40 μm, the transmission axis of the polarizer makes an angle of 42 to 48° with a horizontal line, and the optical axis of the λ/4 film as a phase compensation film makes an angle of 167 to 173° with a horizontal line.

The lower alignment film is a vertical alignment film having a pre-tilt angle of 80 to 90° or less than 2°, and has an alignment angle of −40 to −50° with respect to a horizontal line. The upper alignment film is a horizontal alignment film having a pre-tilt angle of less than 2° or 80 to 90° in the opposite manner to the lower alignment film, and has an alignment angle of 40 to 50° with respect to a horizontal line.

The phase compensation film has a phase compensation delay value of 0.14–0.15 μm.

Figure 8:
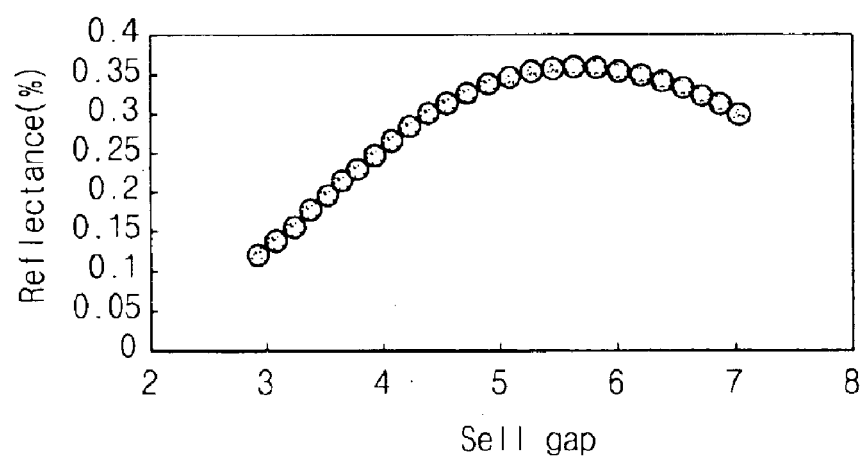
FIG. 8 is a graph showing a change in reflectance according to cell gap.

FIG. 8 is a graph showing a change in reflectance according to cell gap. As shown in FIG. 8, it can be found that the cell gap at which reflectance reaches the maximum is about 5.6 μm.

Figure 9:
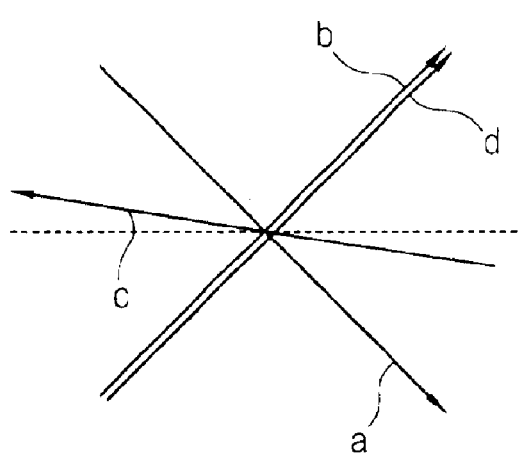
FIGS. 9 and 11 show the axial arrangement of elements of liquid crystal displays according to other embodiments of the present invention.
Figure 11:
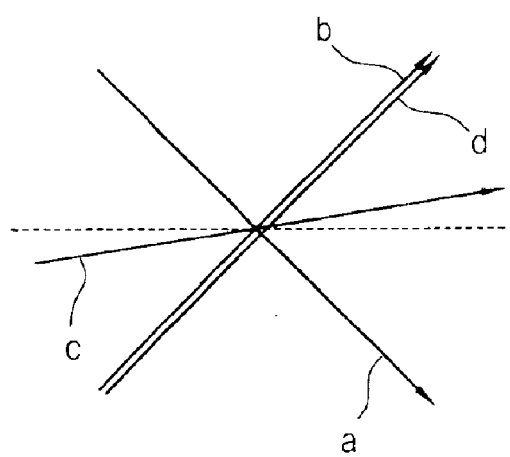

FIGS. 9 and 11 show the axial arrangement of elements of the reflective HAN mode liquid crystal display according to the second embodiment of the present invention. In FIGS. 9 and 11, the reference numeral a designates the rubbing axis of the lower substrate, b the rubbing axis of the upper substrate, c the optical axis of the phase compensation film, and d the transmission axis of the polarizer.

Figure 10:
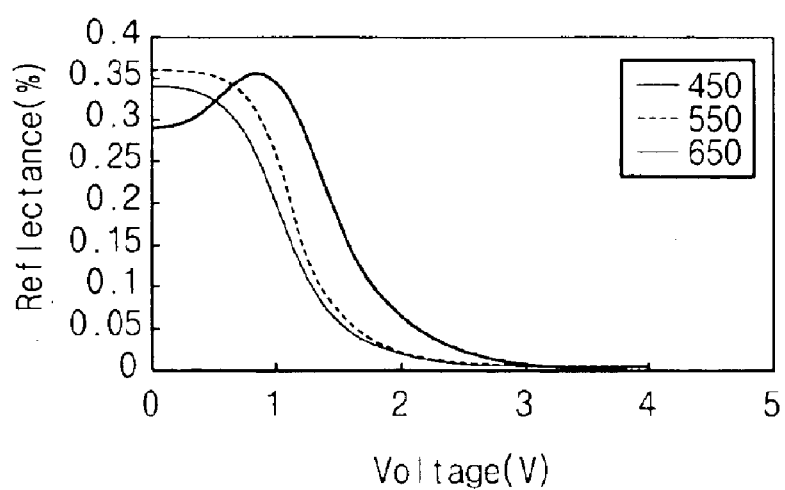
FIGS. 10 and 12 show a change in reflectance according to voltage in liquid crystal displays according to other embodiments of the present invention.
Figure 12:
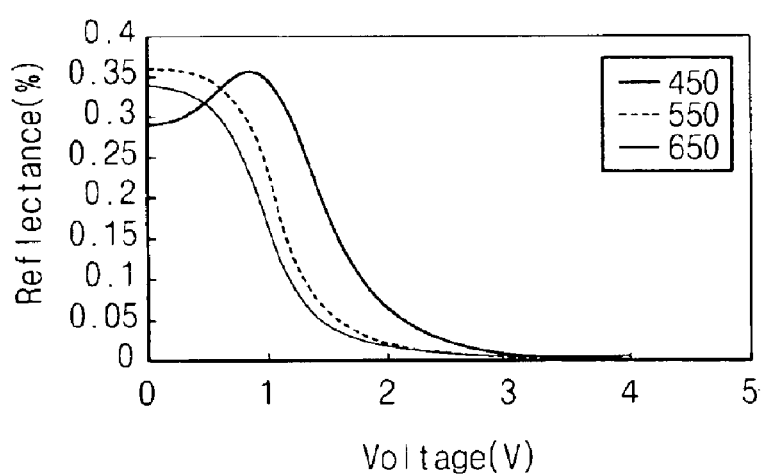

FIGS. 10 and 12 are graphs showing reflectance characteristics according to voltage in the reflective HAN mode liquid crystal displays of FIGS. 9 and 11.

As shown in FIG. 9, the twist angle of liquid crystal molecules is 90°, the pre-tilt angle of the lower alignment film as a horizontal alignment film is 0.2°, the pre-tilt angle of the upper alignment angle as a vertical alignment film is 80 to 90°, the optical axis of the λ/4 film makes an angle of 167 to 173° with respect to a horizontal line, and the transmission axis angle of the polarizer is 42 to 48°. Reflectance characteristics according to voltage in the liquid crystal display of FIG. 9 are shown in FIG. 10.

As shown in FIG. 11, the twist angle of liquid crystal molecules is 90°, the pre-tilt angle of the lower alignment film as a vertical alignment film is 0.2°, the pre-tilt angle of the upper alignment angle as a horizontal alignment film is 80 to 90°, the optical axis of the λ/4 film makes an angle of 7 to 13° with respect to a horizontal line, and the transmission axis angle of the polarizer is 42 to 48°. Reflectance characteristics according to voltage in the liquid crystal display of FIG. 11 are shown in FIG. 12.

As described above, in the liquid crystal display according to the second embodiment of the present invention, the HAN mode liquid crystal layer is used while the pre-tilt angles of the lower and upper alignment films are controlled in the opposite manner to each other. In addition, the optical axis angle of the λ/4 film and the transmission axis angle of the polarizer are suitably controlled. In this way, an optimal cell can be embodied. Particularly, cell gap in the liquid crystal display according to the second embodiment can be designed to have a larger value than that of the first embodiment, so that it allows a more increased process margin to be ensured.

Embodiment 3

Figure 13:
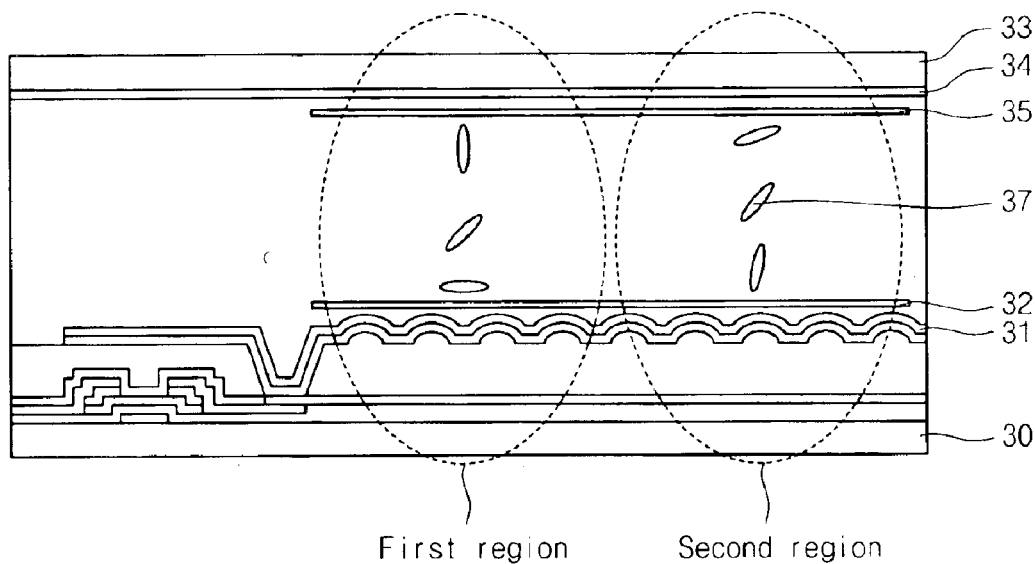
FIG. 13 is a cross-sectional view showing a multi-domain twisted HAN liquid crystal display according to the present invention.

FIG. 13 is a cross-sectional view showing a multi-domain twisted HAN mode liquid crystal display according to a third embodiment of the present invention.

As shown in FIG. 13, the liquid crystal display according to the third embodiment comprises a lower substrate 30 having a reflective electrode 31, an upper substrate 33 having a color filter 34 and disposed opposite to the lower substrate 30. A liquid crystal layer 37 is sandwiched between the lower and upper substrates. A lower alignment film 32 is formed on the reflective electrode 31. A unit pixel of the liquid crystal display according to this embodiment is divided into first and second regions. A portion of the lower alignment film 32 corresponding to the first region is treated such that it vertically or horizontally aligns liquid crystal molecules in the first region, and a portion of the lower alignment corresponding to the second region horizontally or vertically aligns liquid crystal molecules in the second region in the opposite manner to the first region. Moreover, an upper alignment film 35 is formed on the color filter 33. The upper alignment film 35 is treated in the opposite manner to the lower alignment film 32. Namely, a portion of the upper alignment film 35 corresponding to the first region is treated such that it vertically or horizontally aligns liquid crystal molecules in the first region in the opposite manner to the portion of the lower alignment film corresponding to the first region. And a portion of the upper alignment film corresponding to the second region is treated such that it horizontally or vertically aligns liquid crystal molecules in the second region in the opposite manner to the first region.

The alignment angles of the lower alignment film 32 and the upper alignment film 36 are −40 to −50° and 40 to 50° with respect to a horizontal line, respectively. Moreover, the lower alignment film 32 and the upper alignment film 36 are treated to have different pre-tilt angles of less than 2° and 80 to 90°.

The liquid crystal layer 37 is formed of a twisted HAN mode liquid crystal layer, which serves to converts the phase of transmitted light depending on whether electric field is applied or not. The twisted HAN mode liquid crystal layer 37 is made of twisted nematic liquid crystal molecules having a twist angle of 90°, and has a phase delay value (dΔn) of 0.36–0.40 μm.

Although not shown in FIG. 13, on the outer surface of the upper substrate 33, there is adhered a λ/4 film as a phase compensation film serving to convert linearly polarized light into circularly polarized light. A polarizer for converting natural light from the external into linearly polarized light is adhered on the λ/4 film. In this case, the λ/4 film has a phase compensation delay value of 0.14–0.15 μm, and its optical axis makes an angle of 167 to 173° with respect to a horizontal line. The transmission axis of the polarizer makes an angle of 42 to 48°.

Embodiment 4

Figure 14:
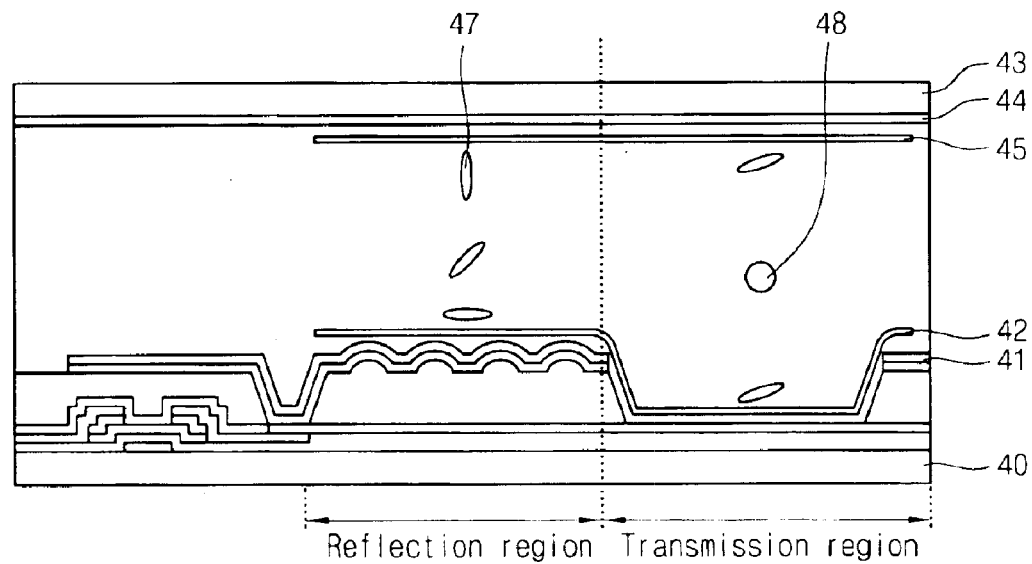
FIG. 14 is a cross-sectional view showing a transflective liquid crystal display having the combined structure of a twisted HAN mode and a TN mode.

FIG. 14 is a cross-sectional view showing a transflective liquid crystal display having a combined structure of twisted HAN mode and TN mode according to a fourth embodiment of the present invention.

As shown in FIG. 14, a unit pixel of a liquid crystal display according to this embodiment is divided into a reflection region and a transmission region. A reflective electrode 41 is formed on a portion of the lower substrate 40, which corresponds to the reflection region. An upper substrate 43 having a color substrate 44 is disposed opposite to the lower substrate 40.

On the lower substrate 40 including the reflective electrode 41, a lower alignment film 42 is formed. A portion of the lower alignment film 42 corresponding to the reflection region is treated such that it vertically or horizontally aligns liquid crystal molecules in the reflection region. A portion of the lower alignment film 42 corresponding to the transmission region is treated such that it horizontally or vertically aligns liquid crystal molecules in the transmission region in the opposite manner to the reflection region. Furthermore, an upper alignment film 45 is formed on the color filter 44. A portion of the upper alignment film 45 corresponding to the reflection region is treated such that it vertically or horizontally aligns liquid crystal molecules in the reflection region in the opposite manner to the portion of the lower alignment film 42 corresponding to the reflection region. A portion of the upper alignment film 45 corresponding to the transmission region is treated such that it vertically or horizontally aligns liquid crystal molecules in the transmission region in the opposite manner to the reflection region. The alignment angles of the lower alignment film 42 and the upper alignment film 45 are −40 to −50° and 40 to 50° with respect to a horizontal line, respectively. Moreover, the lower alignment film 42 and the upper alignment film 45 have different pre-tilt angles of less than 2° and 80 to 90°.

Liquid crystal layers 47 and 48 are sandwiched between the lower substrate 40 and the upper substrate 43. The liquid crystal layers 47 and 48 are made of two liquid crystal modes, i.e., a twisted HAN mode liquid crystal layer 47 and a TN mode liquid crystal layer 48. The twisted HAN mode liquid crystal layer 47 is located at the reflection region, and the TN mode liquid crystal layer 48 is located at the transmission region. The HAN mode liquid crystal layer 47 and the TN mode liquid crystal layer 48 are made of twisted nematic liquid crystals having a twist angle of 90°, and have a phase delay value (dΔn) of 0.36–0.40 μm.

As not shown in FIG. 14, on the outer surface of the upper substrate 43, there is adhered a λ/4 film as a phase compensation film serving to convert linearly polarized light into circularly polarized light. A polarizer is adhered on the λ/4 film. In this case, the λ/4 film has a phase compensation delay value of 0.14–0.15 μm, and its optical axis makes an angle of 167 to 173° with respect to a horizontal line. The transmission axis of the polarizer makes an angle of 42 to 48°.

Meanwhile, as shown in FIG. 14, when the thickness of the liquid crystal layer in the reflection region is d, cell gap in the transmission region is designed as d×2, such that the reflection region and the transmission region have the same phase delay value (dΔn).

Furthermore, when liquid crystal molecules having the same refractive index (Δn) are used, the transmission region having a TN mode is designed such that the distance between the reflective electrode and a counter electrode is about 4.8 μm, and the reflection region having the twisted HAN mode is designed such that the reflective electrode and the counter electrode is about 5.6 μm. In this case, the absorption axis of the polarizer is designed in the same manner. In addition, concave or convex step height can be given in the upper or lower substrate to control cell gap.

As described above, according to the present invention, the design of a liquid crystal cell is optimized so that reflectance according to voltage can be increased. For this reason, contrast ratio and color characteristics can be increased, thereby providing a liquid crystal display having good display characteristics.

In addition, the liquid crystal display of the present invention can be designed to have increased cell gap as compared to that of the prior liquid crystal display. This allows process margin to be increased and thus production yield to be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display, which comprises:

a lower substrate having a reflective electrode; a lower alignment film formed on the lower substrate; an upper substrate having a color filter and disposed opposite to the lower substrate; an upper alignment film formed on the upper substrate; a liquid crystal layer sandwiched between the lower and upper substrates; a phase compensation film adhered on the outer surface of the upper substrate and serving to convert linearly polarized light into circularly polarized light; and a polarizer adhered on the phase compensation film and serving to convert natural light from the external into linearly polarized light;

wherein the lower alignment film has an alignment angle of −10 to 20° with respect to a horizontal line;

the upper alignment film has an alignment angle of 40 to 55° with respect to a horizontal line;

the liquid crystal layer has a phase delay value (dΔn) of 0.24–0.27 μm;

the phase compensation film has a phase compensation function of λ/4 and also has an optical axis making an angle of 140 to 146° with a horizontal line; and the polarizer has a absorption axis making an angle of 120 to 122.5° with a horizontal line.

2. The liquid crystal display of claim 1, wherein the liquid crystal layer is made of twisted nematic liquid crystals having a twist angle of 60°.

* * * * *

UNITED STATES PATENT AND TRADEMARK OFFICE
CERTIFICATE OF CORRECTION

| | | |
|---|---|---|
| PATENT NO. | : 6,947,112 B2 | Page 1 of 1 |
| APPLICATION NO. | : 10/630038 | |
| DATED | : September 20, 2005 | |
| INVENTOR(S) | : Dong Hae Suh et al. | |

It is certified that error appears in the above-identified patent and that said Letters Patent is hereby corrected as shown below:

Title page, Item (30)  delete "10-2003-0045641"
and insert --10-2002-0045641--

Signed and Sealed this

Twentieth Day of May, 2008

JON W. DUDAS
*Director of the United States Patent and Trademark Office*